July 15, 1924.  
B. DARROW  
RIM  
Filed Oct. 11, 1921

1,501,478

Inventor
Burgess Darrow

By R. S. Trogner
Attorney

Patented July 15, 1924.

1,501,478

UNITED STATES PATENT OFFICE.

BURGESS DARROW, OF HUNTINGTON PARK, CALIFORNIA, ASSIGNOR TO THE GOOD-YEAR TIRE & RUBBER COMPANY, OF AKRON, OHIO, A CORPORATION OF OHIO.

RIM.

Application filed October 11, 1921. Serial No. 506,953.

*To all whom it may concern:*

Be it known that I, BURGESS DARROW, a citizen of the United States, residing at Huntington Park, in the county of Los Angeles and State of California, have invented new and useful Improvements in Rims, of which the following is a specification.

My invention relates to rims for pneumatic tires, and it has for its object to provide a rim for wire wheels that shall be particularly strong and durable, of light weight, and on which a tire may be readily changed.

Figure 1:
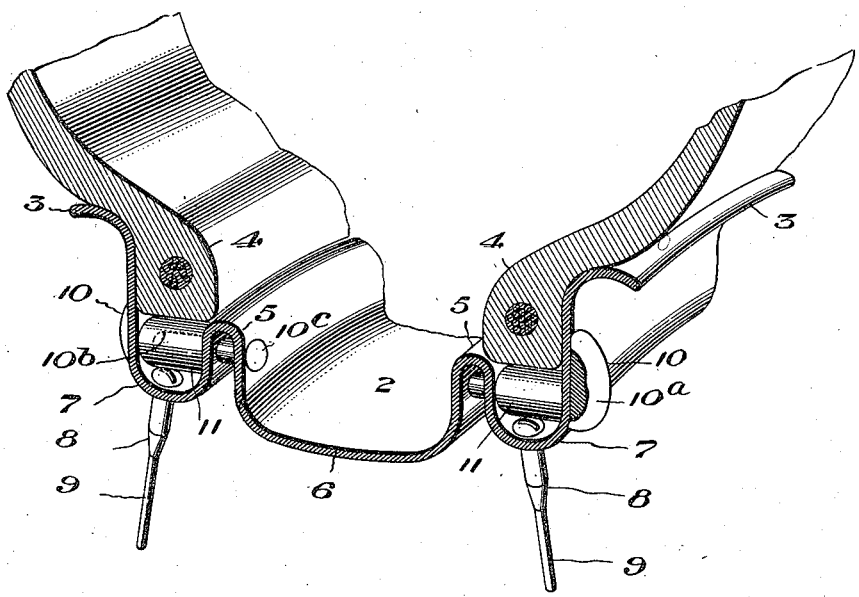
Figure 2:
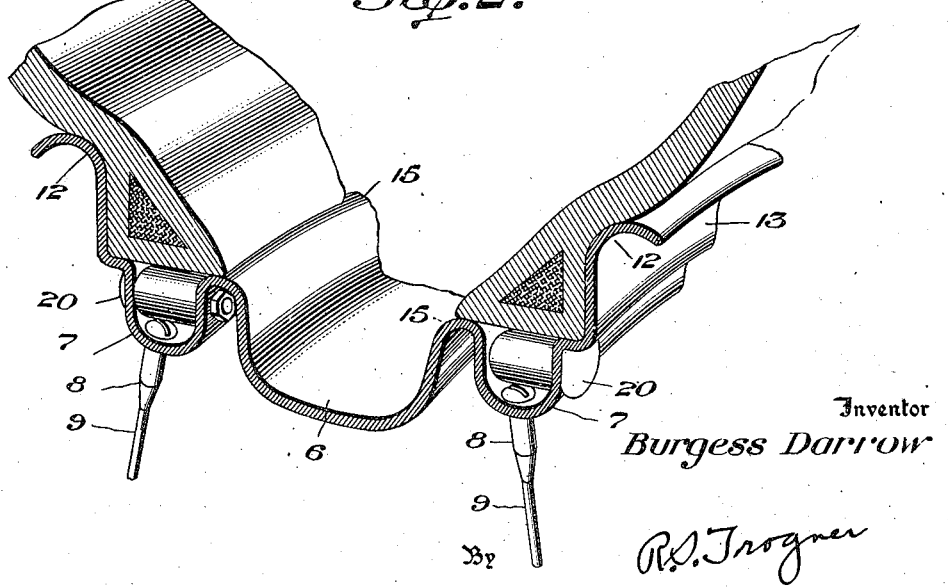

Fig. 1 of the accompanying drawing is a transverse sectional view, shown in perspective, of a portion of a vehicle wheel embodying my invention; and Fig. 2 is a corresponding view of a modification of the invention.

The form of my invention shown in Fig. 1 is particularly adapted for use with airplane wheels and represents a portion of a pneumatic tire 1 that is secured on a rim 2 by means of a pair of upstanding flanges 3 that engage the bead portions 4 of the tire. The rim has a pair of circumferential lands 5 that serve to support the toe of the bead portions 4. A groove 6 is formed between the lands 5 to receive the beads 4 of the tire during the mounting thereof on the rim. This groove can be made sufficiently wide to receive both of the tire beads simultaneously, or of such size as to receive only one of the beads at a time.

A spoke lacing gutter 7 is formed between each tire retaining flange 3 and the adjacent land 5 of the rim. Each of these gutters is adapted to receive a series of nipples 8 of a plurality of wire spokes 9 that comprise the wheel.

The gutters 7 are each reenforced by a series of elements 10 that extend from the outer flanges 3 to the central channel 6 of the rim. Each of these reenforcing elements embodies a head portion $10^a$ that is sufficiently large to partially support the flange 3, a portion $10^b$ that extends across the spoke gutter, and a portion $10^c$ that is riveted, or otherwise suitably secured to the wall of the groove 6. A spacing member 11 is mounted on the central portion $10^b$ of the reenforcing member 10 and extends between the walls of the gutter 7. The spacing members 11 are so arranged that their upper surfaces form a support for the heel of the tire bead 4. If desired, the spacing members 11 and the portion $10^b$ of the reenforcing element may be formed in a single integral piece.

A pneumatic tire may be mounted on a rim of the form described in conjunction with Fig. 1 by placing the two beads of the tire within the central channel 6 on one side of the rim. The innermost bead may then be lifted to its seat on the raised land 5 and the outer bead similarly positioned on its corresponding supporting shoulder. The tire is then ready for inflation.

Designers of vehicle rims have long recognized the fact that the provision of a wide lateral separation between the spoke receiving gutters of a rim confers greater strength on the wheel structure since it permits the more uniform distribution of stress in the several sets of spokes and gives greater lateral strength to the wheel. This feature will readily be appreciated if it is first pointed out that, in the usual form of wire wheel, one set of spokes is forced to sustain a greater proportion of the load than the remaining sets of spokes. The uniform distribution of these load stresses reduces the required size and number of spokes employed, and also provides a wheel having greater lateral strength than is obtainable where the spoke gutters are located more closely together.

The modification shown in Fig. 2 differs from that shown in Fig. 1 in that it employs a pair of outer shoulders 12 that are adapted to engage the heel of the tire beads 4. The upstanding flanges 13, the bead toe-supporting lands 15, the spoke gutters 17, and the central channel 16 of this rim are of substantially the same form as the corresponding portions of the rim shown in Fig. 1 and perform the same functions.

The reinforcing elements 20 that are employed in this rim are shown as partially supporting the bead portions of the tire but they do not necessarily constitute a partial support therefor. These elements are also illustrated as not extending through the wall of the groove 16.

Other modifications of my invention will be apparent to those skilled in the art. I desire, therefore, that only such limitations shall be imposed on the spirit and scope of my invention as are indicated in the accompanying claims.

What I claim is:

1. A unitary rim comprising a pair of upstanding tire retaining flanges, a pair of laterally spaced circumferential gutters formed between the flanges, a central circumferential channel of at least the width of a tire casing bead, a pair of laterally spaced circumferential lands respectively formed between said channel and each of said gutters, and a plurality of reinforcing elements supporting the outer gutter wall from one of the walls of the adjacent land.

2. A unitary rim comprising a central circumferential channel of sufficient width to receive one of the bead portions of a tire casing, a bead seating land formed on each side of said channel, an upstanding tire-retaining flange formed on each marginal portion of said rim, said flange extending substantially the same distance above said land as the channel extends below the land in lateral section, a spoke receiving gutter formed between each of said lands and the corresponding flange, and a plurality of reinforcing elements bridging each of said gutters and supporting each of said flange portions from the side wall of the adjacent land.

3. A unitary rim for pneumatic tires comprising a pair of upstanding bead-retaining flanges, a pair of laterally-spaced circumferential gutters formed between the flanges and each adapted to receive a plurality of spoke nipples, a pair of laterally-spaced circumferential lands formed between the gutters, and a relatively deep central groove formed between the lands.

4. A unitary rim for pneumatic tires comprising a pair of upstanding bead-retaining flanges, a pair of laterally spaced circumferential gutters formed between the flanges, each of said gutters being adapted to receive a series of spoke nipples, a pair of laterally spaced circumferential lands formed between the gutters, a relatively deep central groove formed between the lands, and a plurality of reenforcing elements extending from the lands to the flanges.

5. A unitary rim for pneumatic tires comprising a pair of upstanding bead-retaining flanges, a pair of laterally-spaced circumferential gutters formed between the flanges, each of said gutters being adapted to receive a series of spoke nipples, a pair of laterally spaced circumferential lands formed between the gutters, a relatively deep central groove formed between the lands, and a plurality of reenforcing elements extending across the top of the gutters and flush with the land.

In witness whereof I have hereunto signed my name in the presence of two subscribing witnesses.

BURGESS DARROW.

Witnesses:
H. B. HUMPHREY,
C. CLIFFORD BIEHL.